United States Patent [19]
Baker et al.

[11] Patent Number: 5,127,926
[45] Date of Patent: Jul. 7, 1992

[54] MEMBRANE PROCESS FOR TREATING PUMP EXHAUSTS

[75] Inventors: Richard W. Baker, Menlo Park; Jürgen Kaschemekat, Palo Alto, both of Calif.

[73] Assignee: Membrane Technology & Research, Inc., Menlo Park, Calif.

[21] Appl. No.: 696,214

[22] Filed: May 6, 1991

[51] Int. Cl.$^5$ ............................................. B01D 53/22
[52] U.S. Cl. .......................................... 55/16; 55/68; 55/71; 55/73
[58] Field of Search ................. 55/16, 68, 158, 71, 55/73

[56]  References Cited

U.S. PATENT DOCUMENTS

| | | | |
|---|---|---|---|
| 2,159,434 | 5/1939 | Frey | 55/16 X |
| 3,324,626 | 6/1967 | Dresser et al. | 55/16 |
| 3,661,724 | 5/1972 | Strickler | 55/16 X |
| 3,792,570 | 2/1974 | Biondi et al. | 55/158 X |
| 3,961,917 | 6/1976 | Benedict et al. | 55/158 X |
| 4,230,463 | 10/1980 | Henis et al. | 55/16 |
| 4,243,701 | 1/1981 | Riley et al. | 55/158 |
| 4,553,983 | 11/1985 | Baker | 55/16 |
| 4,840,646 | 6/1989 | Anand et al. | 55/16 |
| 4,994,094 | 2/1991 | Behling et al. | 55/16 |
| 5,006,132 | 4/1991 | DiMartino, Sr. et al. | 55/16 |

FOREIGN PATENT DOCUMENTS

| | | | |
|---|---|---|---|
| 0247585 | 12/1987 | European Pat. Off. | 55/16 |
| 3726431 | 2/1989 | Fed. Rep. of Germany | 55/158 |
| 62-049929 | 3/1987 | Japan | 55/158 |
| 1-160803 | 6/1989 | Japan | 55/16 |

OTHER PUBLICATIONS

Y. Shindo et al., "Calculation Methods for Multicomponent Gas Separation by Permeation", *Separation Science & Technology*, 20 (5 and 6), pp. 445-459, 1985.

K. V. Peinemann et al., "The Separation of Organic Vapors from Air", AICHE Symposium Series No. 250, vol. 82, pp. 19-26, 1986.

S. S. Kremen, "Technology and Engineering of ROGA Spiral Wound Reverse Osmosis Membrane Modules", in *Reverse Osmosis and Synthetic Membranes*, S. Sourirajan (Ed.), National Research Council of Canada, Ottawa, 1977.

*Primary Examiner*—Robert Spitzer
*Attorney, Agent, or Firm*—J. Farrant

[57] ABSTRACT

A process for removing an undesirable vapor from a pump exhaust by a membrane separation process. The process takes advantage of the pressure difference between the inlet and outlet sides of the pump to provide the driving force for membrane permeation. The process of the invention can reduce the emission of pollutants or impurities from pumps to a very low level, such as 10% or less of its previous value, with little extra expenditure of energy.

25 Claims, 4 Drawing Sheets

MEMBRANE PROCESS FOR TREATING PUMP EXHAUSTS

FIELD OF THE INVENTION

The invention relates to removing undesirable components from pump exhausts.

BACKGROUND OF THE INVENTION

Pumps pervade industry. They are used to transfer fluids for every imaginable use, and to raise or lower the fluid pressure as appropriate. The common factor in all pumping is that there is a suction, or low-pressure, zone on the inlet side and a compression, or high-pressure, zone on the outlet side. On the outlet side, the fluid may pass on to another destination, or it may be a waste stream that is discharged.

The fluid stream passing through the pump may be gas or liquid. Gas emissions from pumps are often contaminated with vapors whose release to the atmosphere is environmentally undesirable or unacceptable, such as hydrocarbons, aromatic hydrocarbons, chlorinated hydrocarbons, fluorinated hydrocarbons, ammonia, sulfur dioxide or hydrogen sulfide. Likewise, when the outlet stream from the pump is to be passed to some other operation, not vented, it may contain vapor impurities the removal of which from the stream would be advantageous.

An undesirable component may be present in the gas on the inlet side of the pump, or it may be picked up as the gas goes through the pump. One specific instance of this is when the pump is a liquid-ring pump. In liquid-ring pumps, the pumping action is provided by a ring of liquid sealant or compressant. This ring may be water or some other liquid. The choice of liquid sealant is vast, including oils, hydrocarbons, chlorinated hydrocarbons, alcohols and inorganic liquids. Depending on vapor pressure and other factors, some sealant vapor will always be present in the outlet gas.

No cheap, reliable technology exists to treat pump outlet streams to an adequate level. Many pumps are already equipped with an external condenser that treats the exit stream to remove pollutants. Nevertheless, there is a practical limit, usually set by the process economics, on the amount of the pollutant that can be removed. There remains a need for economical ways of reducing the pollution caused by pump emissions, and for treating internal process streams passing through pumps.

SUMMARY OF THE INVENTION

The invention is a process for removing undesirable components from gas streams that pass through pumps. The process takes advantage of the one characteristic common to all pumps: the pressure difference between the inlet and outlet sides.

The invention involves removing the undesirable component by a membrane separation process. In membrane separation, a feed gas mixture is passed across the surface of a membrane through which two components of the mixture permeate at different rates, enabling a separation between the components to be made. Gas flow through the membrane is maintained by providing a driving force, often in the form of a pressure difference between the feed and permeate sides. As part of the membrane separation apparatus, it is known to include a vacuum pump to lower the pressure on the permeate side, or a compressor to raise the pressure on the feed side, or both.

What is recognized in the present invention is that where a gas stream containing an undesirable vapor passes, for whatever reason, through a pump, this presents an excellent opportunity to remove the vapor cheaply, efficiently and without having to expend large amounts of extra energy, by simply connecting a membrane unit between the outlet and inlet sides of the pump to form a pump/membrane loop, and using the pressure difference as the driving force for the membrane separation process. If the membrane is preferentially permeable to the undesirable vapor, vapor will be removed from the feed side and concentrated on the permeate side. The residue stream leaving the feed side of the membrane may pass on downstream to wherever its destination would have been absent the membrane system. However, the removal of undesirable vapor achieved by the membrane means that the need for a separate treatment system downstream, or for complex pooling of exhaust streams for pollution control, is obviated or at least substantially reduced.

Vapor can be removed from the pump/membrane loop at any point by condensation, absorption or any other convenient method. The process of the invention can reduce the emission of pollutants or impurities from pumps to a low level, such as 10% or less of its previous value, with little extra expenditure of energy. In cases where the pollutant is a high-value chemical, the operating cost may be completely offset by the value of the recovered chemical.

It is an object of the invention to provide a process for removing an undesirable vapor from a pump exhaust stream.

It is an object of the invention to reduce atmospheric emissions of pollutants in pump exhausts.

It is an object of the invention to recover organic compounds from pump exhausts.

It is an object of the invention to recover pump sealant.

Other objects and advantages of the invention will be apparent from the description of the invention to those of ordinary skill in the art.

It is to be understood that the above summary and the following detailed description are intended to explain and illustrate the invention without restricting its scope.

DETAILED DESCRIPTION OF THE INVENTION

The process of the invention involves removing vapor from a gas stream that passes through a pump. The gas stream may contain the vapor before entering the pump or may pick it up within the pump. The vapor may be an organic compound or mixture of compounds, such as a hydrocarbon, an aromatic hydrocarbon, a halogenated hydrocarbon or the like, or an inorganic compound, such as water, sulfur dioxide, ammonia, etc.

The other component or components of the feed gas stream may be other vapors, nitrogen, air or any other gas.

The removal process involves membrane separation. The membrane used to perform the separation may be a homogeneous membrane, a membrane incorporating a gel or liquid layer, or any other type known in the art that can function with a pressure difference as the driving force. Two types of membrane are preferred. The first is a composite membrane, comprising a microporous support, onto which the permselective layer is deposited as an ultrathin coating. The second is an asymmetric membrane in which the thin, dense skin of the asymmetric membrane is the permselective layer. Both composite and asymmetric membranes are known in the art. References that teach the production of such membranes include U.S. Pat. Nos. 4,243,701; 4,553,983; 4,230,463; and 4,840,646.

The form in which the membranes are used in the invention is not critical. They may be used, for example, as flat sheets or discs, coated hollow fibers, or spiral-wound modules, all forms that are known in the art. Spiral-wound modules are a convenient choice. References that teach the preparation of spiral-wound modules are S. S. Kremen, "Technology and Engineering of ROGA Spiral Wound Reverse Osmosis Membrane Modules", in *Reverse Osmosis and Synthetic Membranes*, S. Sourirajan (Ed.), National Research Council of Canada, Ottawa, 1977; and U.S. Pat. No. 4,553,983, column 10, lines 40–60. Alternatively the membranes may be configured as microporous hollow fibers coated with the permselective polymer material and then potted into a module.

Figure 1:
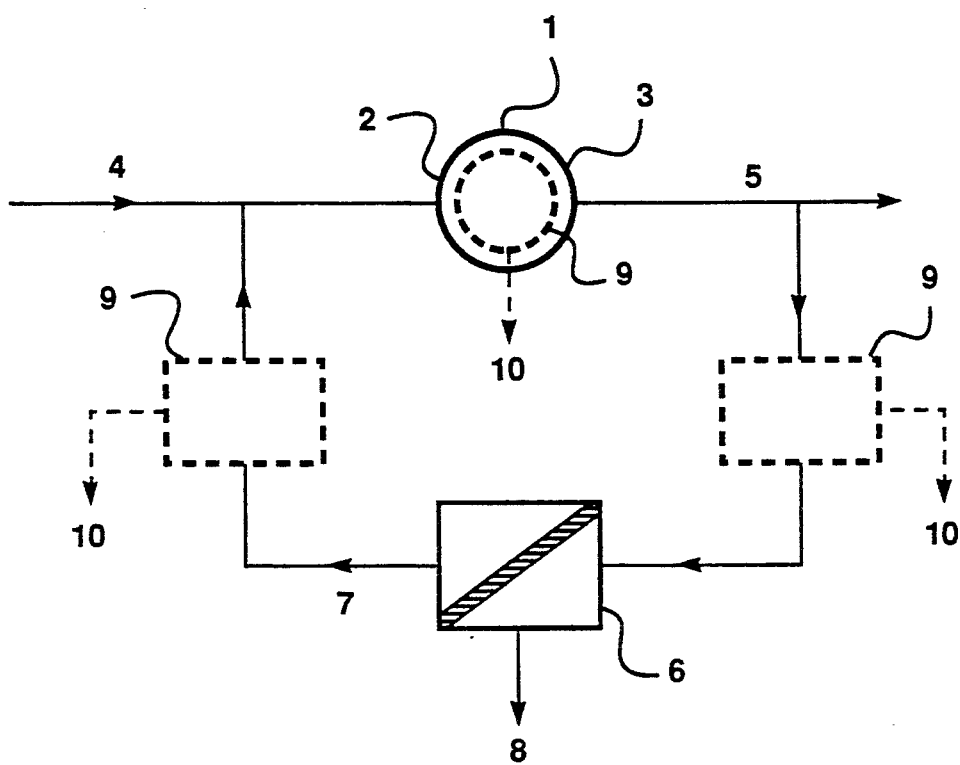
FIG. 1 is a schematic drawing showing a basic embodiment of the invention with optional placings for the removal unit.

A basic embodiment of the invention is shown in FIG. 1. Referring to this figure, numeral 1 refers generally to any gas pump, such as a vacuum pump or compressor of any type; a rotary vane pump, a liquid ring pump, a diaphragm pump, a piston pump, a jet ejector, etc. Gas stream 4 is sucked into the pump at low-pressure side 2 and exists as stream 5 at high-pressure side 3. Stream 5 is a gas mixture containing an undesirable vapor. Stream 5 passes in whole or in part to membrane separation unit 6, containing one or more membranes. Any portion of stream 5 that is not passed to the membrane unit may be discharged, or may pass on to any destination downstream or upstream of the pump. The membrane separation step normally involves running the feed gas stream across a membrane that is selectively permeable to the vapor that is to be removed. The vapor is concentrated in permeate stream 7; residue stream 8 is correspondingly depleted in vapor. Residue stream 8 may be vented to the atmosphere, may pass on as an internal process stream or may be recirculated. For example, if the pump were drawing a vacuum on a chamber or container, it may be appropriate to return stream 8 to the container. Numeral 9 refers to a removal unit for removing the undesirable component from the pump/membrane loop. The removal unit will most generally be a condenser or an absorption unit and may be placed before or after the membrane unit as convenient. If the pump is a liquid-ring pump, condensation or absorption may take place within the pump, so that no removal unit is needed. Pollutant is withdrawn from the pump/membrane loop as stream 10 and can be used elsewhere, recycled, subjected to additional treatment or disposed of as appropriate.

A number of factors have an effect on the performance of the membrane process. Important parameters include the selectivity of the membrane, the ratio of the permeate and feed pressures, and the ratio of the permeate and feed flows.

To separate the components of the gas stream requires a permselective membrane that is preferentially permeable to one component over the others. The mathematical model used to predict permeation behavior is the solution-diffusion model. In simple systems, where the rate-limiting step is diffusion through the membrane, Fick's Law of diffusion leads to the equation.

$$J = \frac{Dk\Delta p}{l}, \quad (1)$$

where J is the membrane flux (cm$^3$(STP)/cm$^2$·s·cmHg), D is the diffusion coefficient of the gas or vapor in the membrane (cm$^2$/sec) and is a measure of the gas mobility, l is the membrane thickness, k is the Henry's law sorption coefficient linking the concentration of the gas or vapor in the membrane material to the pressure in the adjacent gas (cm$^3$(STP)/cm$^3$·cmHg), and $\Delta p$ is the pressure difference across the membrane. The product Dk can also be expressed as the permeability, P, a measure of the rate at which a particular gas or vapor moves through a membrane of standard thickness (1 cm) under a standard pressure difference (1 cmHg).

A measure of the ability of a membrane to separate two components, (1) and (2), of a feedstream is the ratio of their permeabilities, $\alpha$, called the membrane selectivity, $$\alpha_{2/1} = \frac{P_{(2)}}{P_{(1)}}. \quad (2)$$

A second factor affecting the performance of a membrane system is the ratio, $\phi$, of the feed pressure to the permeate pressure. Transport of a component through the membrane will stop if the partial pressure of that component on the permeate side of the membrane exceeds the partial pressure on the feed side. The relationship between pressure ratio and selectivity can be derived from Fick's law and is discussed in detail in an article by K.-V. Peinemann et al. in AIChE Symposium Series number 250, Vol. 82(1986). When the pressure ratio, $\phi$, is much greater than the membrane selectivity, $\alpha$, the permeate concentration is proportional to the membrane selectivity and is essentially independent of the pressure ratio. When the pressure ratio is much smaller than the membrane selectivity, the permeate concentration of a component is proportional to the pressure ratio and is essentially independent of the membrane selectivity. In the intermediate range, both the pressure ratio and the membrane selectivity affect the membrane system performance. Although the separation achieved always increases as the membrane selectivity increases, there is a point for any given pressure ratio at which further increases in selectivity are relatively unimportant.

Pressure ratios that may be encountered in a pumping operation vary enormously, depending on the type of pump and the use to which it is put. In vacuum operations, pressure ratios of the order 10 or more are common. In this case a membrane selectivity of at least 5, more preferably 10 and most preferably 20 is desirable. On the other hand, if the pressure ratio is as low as 2, 3 or 4, as may be the case in a compression operation, a membrane selectivity of 5 may be adequate and the benefits of a higher membrane selectivity, such as 10 or 20, may be negligible.

The process of the invention can be designed to achieve high levels of removal, such as 70%, 80%, 90% or greater, of the undesirable component of the pump exhaust. If a small membrane unit is used to treat a large gas stream, the fraction of the pollutant removed from the stream will be small. As the membrane area is increased, the fractional removal will increase. However, the quantity of permeate gas that must be recycled through the pump will also increase, increasing the energy consumption of the pump. In general, it is possible to achieve 90% removal of pollutant while holding the recycle stream to no more than 10-20% of the feed stream to the membrane unit. If a greater degree of removal is required, the recycle stream will be larger; if a lesser degree of removal is adequate, it may be smaller. To achieve 99% removal, for example, may require recycle of 20%, 30% or 40% of the feed stream. To achieve 80% may require only 5% recycle. The percentage recycle is also called the stage cut.

FIG. 1 shows one membrane module. It will be apparent, however, that the process could be carried out with an array of membrane modules, arranged such that a fraction of the feed gas passes through each individual module or such that the feed gas passes through the individual modules in series.

FIG. 1 shows a removal unit used to remove the undesirable vapor from the pump/membrane loop. Various means of removing vapor are possible within the scope of the invention. The removal unit may be a heat exchanger or chiller that causes condensation of some of the vapor contained in the stream passing through it. It may be a direct contact condenser. It may be a unit that extracts, absorbs or adsorbs vapor. It may contain a chemical scrubbing agent. For example, an aqueous alkali solution might be used to absorb acid vapors such as sulfur dioxide or hydrogen sulfide. It may contain an absorbing liquid, such as oil used to capture gasoline vapors. It may contain activated carbon or a molecular sieve material to remove vapors by adsorption. A useful benefit of the invention is that vapor of the absorption medium is not emitted to the atmosphere or passed along in the process train but is recovered in the permeate stream from the membrane. In some applications, such as where absorption is already used to treat the pump exhaust stream, recovery of the absorption medium may be more important than removal of the pollutant vapor remaining in the absorption unit outlet.

FIG. 1 shows the permeate stream mixing with the inlet stream and passing directly into the pump. However it may be convenient in some situations to mix the permeate with the inlet gas further upstream of the pump, and this is also within the scope of the invention. For example, stream 4 may contain a high concentration of the undesirable vapor. Running stream 4 through a condenser before it enters the pump may cause condensation of a fraction of the undesirable vapor, so that the stream that is sucked in at the pump inlet contains both gas and liquid. If the pump is a liquid-ring pump, this is perfectly acceptable and may often even be very desirable, because the volume of gas to be pumped decreases substantially. In this case, it is preferable to return the vapor-enriched permeate stream to the incoming stream before the condenser, so that a portion of the vapor from the permeate stream is also condensed.

FIG. 1 shows one pump. It will be apparent to one of skill in the art, however, that the process would also be applicable in situations where multiple pumps are used in series. A common example is a combination of one or more ejectors and a liquid-ring pump, such as is often used where a sufficiently low pressure cannot be achieved with the vacuum pump alone. The pump could also be used in combination with a blower to achieve the required pressure change. In these instances, the pump/membrane loop could be closed by connecting the permeate side of the membrane upstream of all pumps or between pumps as appropriate to the specific circumstances. Such configurations are also commonly combined with a condenser as described in the paragraph above.

The process of the invention could be used for diverse applications, including vacuum applications, compressor applications and pump sealant recovery applications.

Typical vacuum-driven applications are vapor recovery from vacuum dryers and evaporators, in which solvent and other vapors are removed from solutions, process materials, etc. Similar streams are produced by vacuum rotary filters or distillation tower vent streams. In these applications, the vacuum pump exhaust is often heavily contaminated with one or more of a wide variety of organic and inorganic vapors.

Compressors that could utilize the process of the invention are found, for example, throughout the oil, gas and petrochemical industries, where they deal with hydrocarbon-containing streams of many different types. As the pressure of the gas stream is raised, condensable components in the stream approach their saturation vapor pressure. This is undesirable, because it means hydrocarbon condensation within pipes and process equipment is possible. Connecting a membrane unit across the compressor to decrease the dewpoint of the gas by removing a portion of the hydrocarbon is very advantageous. A typical use would be in dewpoint adjustment of $C_3$, $C_4$, $C_5$ and greater hydrocarbons found in natural gas streams.

A third application is sealant vapor recovery. In a liquid-ring pump, the pumping action is provided by a ring of liquid sealant. This ring may be water or some other liquid. The choice of liquid sealant is vast, including oils, hydrocarbons, chlorinated hydrocarbons, alcohols and inorganic liquids. If the gas to be pumped contains a high vapor concentration, it may be possible to use that vapor, condensed within the pump, as the sealant. Depending on the vapor pressure and other factors, some sealant vapor will always be present in the pump exhaust stream. Besides representing a loss of sealant, the presence of this vapor is often a problem in venting or in downstream use of the pump outlet gas. Connecting a membrane unit across the pump could enable sealant vapor to be captured and returned to the pump inlet.

The invention is now further illustrated by the following examples, which are intended to be illustrative of the invention, but are not intended to limit the scope or underlying principles in any way.

EXAMPLES

Example 1

Removal of Xylene Vapor From a Vacuum Pump Exhaust.

Figure 2:
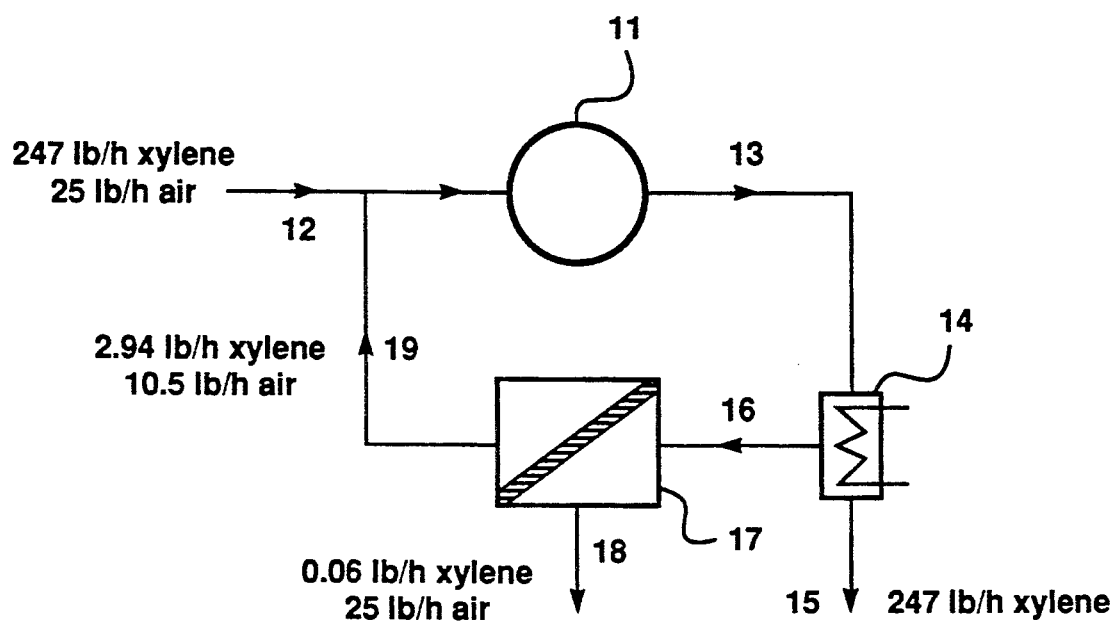
FIG. 2 is a schematic drawing of a xylene removal process.

A vacuum pump is used to remove air leaking into a xylene distillation process. A membrane unit is connected between the outlet and inlet sides of the vacuum pump. Liquid xylene is removed from the pump/membrane loop by condensation. The example uses a computer calculation, performed using a computer program based on the membrane gas permeation equations for cross flow conditions described by Shindo et al., "Calculation Methods for Multicomponent Gas Separation by Permeation," *Sep. Sci. Technol*, 445–459 (1985). The selectivity of the membranes for xylene/air is assumed to be 50. The process is shown schematically in FIG. 2. Referring now to this figure, stream 12 drawn off by the vacuum pump, 11, comprises 247 lb/h of xylene and 25 lb/h of air. The stream is at 115° F. and 50 mmHg absolute pressure. Exhaust stream 13 from the vacuum pump is at atmospheric pressure. Membrane unit 17 is connected across vacuum pump 11. Gas stream 16 is passed across the surface of a membrane selectively permeable to xylene. Permeate stream 19 is enriched in xylene compared with stream 16 and passes to the low-pressure side of the vacuum pump. Stream 18, containing only 0.06 lb/h xylene, compared with 25 lb/h in the feed, is vented to the atmosphere. Xylene is removed from the pump/membrane loop by condenser 14, operating at 115° F. Stream 15 of liquid xylene is withdrawn from the condenser at a rate of 247 lb/h. In this example, the stage cut is 35–40%, because of the high level of xylene removal. The recycle stream to the pump inlet is just under 5% of the stream from the distillation process and increases the energy requirement of the pump by only a few percent.

Example 2

Removal of Perchloroethylene Vapor from a Vacuum Filtration Operation.

Figure 3:
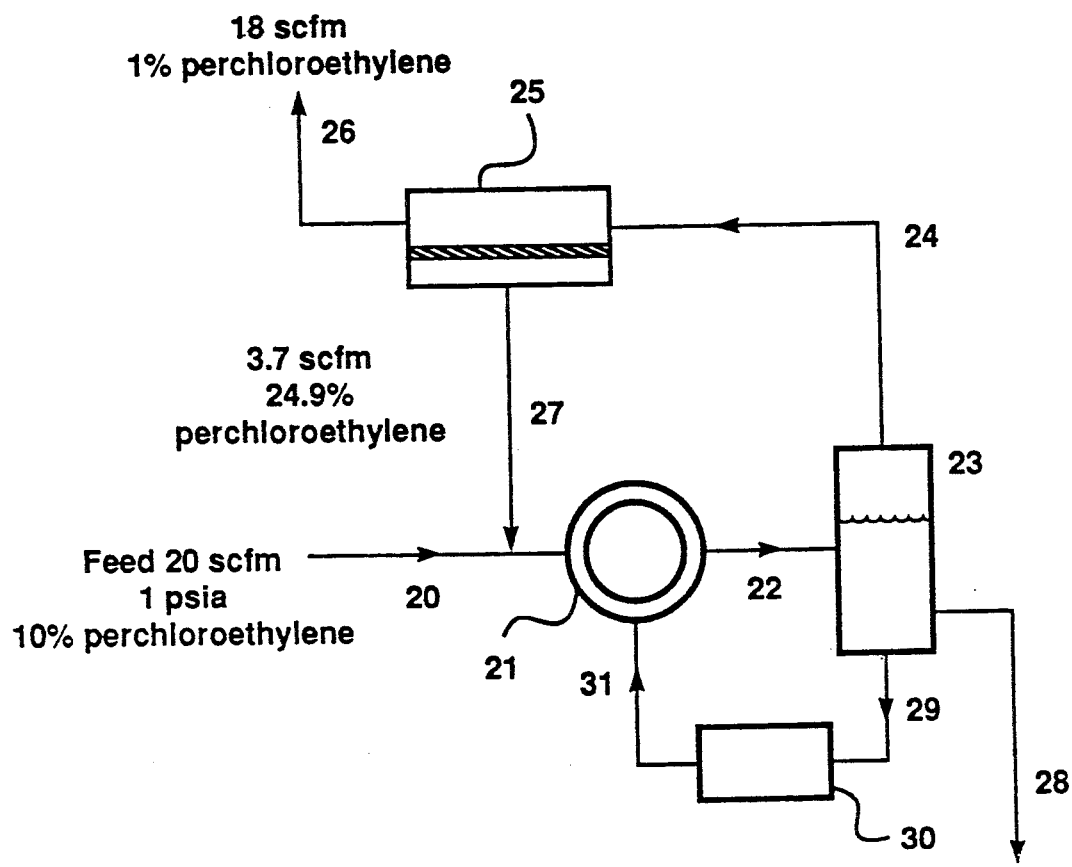
FIG. 3 is a schematic drawing of a perchloroethylene removal process.

A liquid-ring vacuum pump is used in a vacuum filtration operation. The air passing through the pump contains about 10% perchloroethylene and is at a pressure of 1 psia. A perchloroethylene removal process in accordance with the invention is shown in FIG. 3. The membrane performance is calculated using the same computer calculations as in Example 1. Referring now to FIG. 3, stream 20, having a flow rate of 20 scfm, is drawn through liquid ring pump 21. Exhaust stream 22 from the pump passes to separator 23 from which liquid perchloroethylene stream 28 is drawn off. Gas stream 24 from the separator contains about 5% perchloroethylene vapor. A membrane unit 25 is connected between the outlet and inlet sides of the liquid ring pump. Gas stream 24 is passed across the surface of a membrane with a perchloroethylene/air selectivity of 35. Permeate stream 27 is enriched in perchloroethylene compared with stream 24 and is mixed with incoming feed stream 20 and passes to the low-pressure side of the pump. Stream 26, containing only 1% perchloroethylene, is vented to the atmosphere. Stream 27 has a volume of approximately 3.7 scfm and contains 24.9% perchloroethylene. This stream increases the size of the vacuum pump required for the vacuum operation by 15–20% and reduces the perchloroethylene emissions by 80%. Stream 29 is withdrawn from the gas/liquid separator and passed through heat exchanger 30 and thence, as stream 31, to the pump to be used as sealant.

Example 3

Removal of Sealant Vapor from a Compressor Exhaust.

Figure 4:
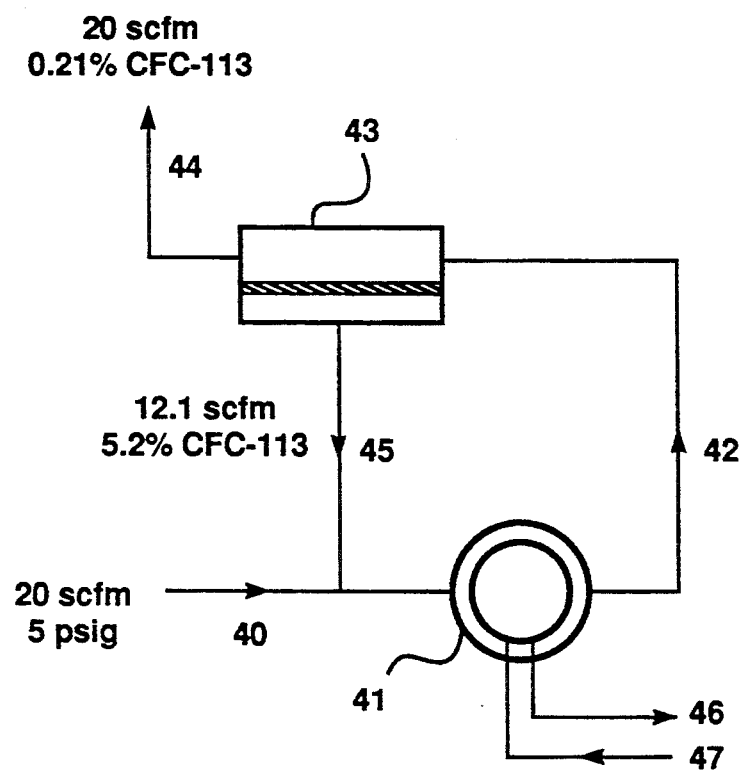
FIG. 4 is a schematic drawing of a CFC-113 removal process.

A compressor uses CFC-113 as a sealant fluid in a gas compression operation because of its low reactivity. However, CFC-113 has a significant vapor pressure at the operating temperature, 0° C., of the pump. As a result, the gas leaving the pump contains about 2.1% CFC-113. A CFC-113 removal process in accordance with the invention is shown in FIG. 4. The membrane performance is calculated using the same computer calculations as in Example 1. Referring now to FIG. 4, stream 40, having a flow rate of 20 scfm and at 5 psig, is drawn through liquid-ring compressor 41. Exhaust stream 42 is at a pressure of 100 psig and contains 2.1% CFC-113. A membrane unit 43 is connected between the outlet and inlet sides of the compressor. Gas stream 42 is passed across the surface of a membrane with a CFC-113/air selectivity of 20. Permeate stream 45 contains about 5.2% CFC-113 and is mixed with the incoming stream to the compressor. Streams 46 and 47 withdraw excess sealant or add additional sealant to the compressor as necessary. Stream 44, containing only 0.21% CFC-113, is vented.

Example 4

Removal of Hydrogen Sulfide from a Liquid-Ring Vacuum Pump Exhaust used to Provide Vacuum Required for a Filter in a Stretford Sulfide Abatement Process.

A liquid-ring vacuum pump draws off a hydrogen-sulfide-containing stream at a pressure of 1 psia. The outlet gas from the vacuum pump contains 200 ppm hydrogen sulfide at 15 psia and is flowing at a rate of 100 scfm. It is desired to lower the hydrogen sulfide content of the exhaust to 20 ppm.

A membrane unit, containing a polyether-polyamide block copolymer membrane with a hydrogen sulfide/air selectivity of 100, is connected between the high and low pressure sides of the vacuum pump. The membrane performance is calculated using the same computer calculations as in Example 1. The outlet gas from the vacuum pump passes through the membrane unit, producing a residue stream containing 20 ppm hydrogen sulfide and a permeate stream containing 1,400 ppm hydrogen sulfide. The permeate stream is returned to the pump inlet so that the hydrogen sulfide can be removed by the absorbent fluid used as the pump sealant.

I claim:
1. A pumping process, comprising:
   (a) drawing a feed gas stream into a pump on a first, inlet side;
   (b) exhausting an exhaust gas stream containing a vapor from said pump on a second, outlet side;
   (c) providing a membrane having a feed side and a permeate side, said membrane being connected between said outlet and inlet sides to form a pump-/membrane loop, such that at least a portion of said exhaust gas passes to said feed side;
   (d) withdrawing from said feed side a residue stream depleted in said vapor compared with said portion of said exhaust gas;

(e) withdrawing from said permeate side a permeate stream enriched in said vapor compared with said portion of said exhaust stream;

(f) passing said permeate stream to said inlet side and drawing it into said pump with said feed gas stream;

(g) removing at least a portion of said vapor from said loop.

2. The process of claim 1, wherein said membrane is a composite membrane comprising a microporous support layer and a thin permselective layer.

3. The process of claim 1, wherein at least 90% of said vapor is removed from said portion of said exhaust stream.

4. The process of claim 1, wherein the whole of said exhaust stream is passed to said feed side.

5. The process of claim 1, wherein said pump is a vacuum pump.

6. The process of claim 1, wherein said pump is a liquid-ring pump.

7. The process of claim 6, wherein said removing is carried out within said pump.

8. The process of claim 1, wherein said vapor is a hydrocarbon.

9. The process of claim 1, wherein said vapor is an aromatic hydrocarbon.

10. The process of claim 1, wherein said vapor is a halogenated hydrocarbon.

11. The process of claim 1, wherein said vapor is an alcohol.

12. The process of claim 1, wherein said vapor is inorganic.

13. The process of claim 1, wherein said removing is carried out by condensation.

14. The process of claim 13, wherein said removing is carried out on said exhaust stream.

15. The process of claim 13, wherein said removing is carried out on said permeate stream.

16. The process of claim 1, wherein said removing is carried out by absorption.

17. The process of claim 16, wherein said removing is carried out on said exhaust stream.

18. The process of claim 16, wherein said removing is carried out on said permeate stream.

19. The process of claim 1, wherein said removing is carried out by chemical scrubbing.

20. The process of claim 13, wherein said removing is carried out on said exhaust stream.

21. The process of claim 19, wherein said removing is carried out on said permeate stream.

22. The process of claim 1, wherein said removing is carried out by adsorption.

23. The process of claim 22, wherein said removing is carried out on said exhaust stream.

24. The process of claim 22, wherein said removing is carried out on said permeate stream.

25. The process of claim 1, wherein said vapor is produced within said pump.

* * * * *